United States Patent
Patel et al.

(10) Patent No.: US 9,482,140 B2
(45) Date of Patent: Nov. 1, 2016

(54) MOUNTING SYSTEM FOR AFTERTREATMENT COMPONENT

(71) Applicant: Electro-Motive Diesel Inc., LaGrange, IL (US)

(72) Inventors: Ajay Patel, Joliet, IL (US); Stephen M. Bednarz, De Kalb, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 233 days.

(21) Appl. No.: 14/267,435

(22) Filed: May 1, 2014

(65) Prior Publication Data

US 2015/0314236 A1 Nov. 5, 2015

(51) Int. Cl.
| | | |
|---|---|---|
| F16L 11/12 | (2006.01) | |
| F01N 13/18 | (2010.01) | |
| B01D 53/94 | (2006.01) | |
| F16L 23/16 | (2006.01) | |

(52) U.S. Cl.
CPC ............ *F01N 13/1816* (2013.01); *B01D 53/94* (2013.01); *F01N 13/185* (2013.01); *F01N 13/1844* (2013.01); *F16L 23/16* (2013.01)

(58) Field of Classification Search
USPC .......... 285/226, 225, 224, 52, 148.1, 148.3, 285/148.19, 148.22, 148.23, 148.25, 285/148.28, 53
See application file for complete search history.

(56) References Cited

U.S. PATENT DOCUMENTS

| | | | | | |
|---|---|---|---|---|---|
| 393,139 | A | * | 11/1888 | Bodycomb | ................ 285/148.3 |
| 628,018 | A | * | 7/1899 | Muskett | ....................... 285/114 |
| 715,423 | A | * | 12/1902 | Ryan | ....................... 285/148.25 |
| 768,228 | A | * | 8/1904 | Hurst et al. | .............. 285/148.28 |
| 1,117,961 | A | * | 11/1914 | Phillips | ......................... 285/225 |
| 1,986,357 | A | * | 1/1935 | Perry | .............................. 285/53 |
| 2,461,100 | A | * | 2/1949 | White | ....................... 285/148.22 |
| 2,992,023 | A | * | 7/1961 | Yantis | .............................. 285/97 |
| 3,202,443 | A | * | 8/1965 | Bergeson et al. | .............. 285/20 |
| 3,288,497 | A | * | 11/1966 | Nydam | .................... 285/148.23 |
| 3,711,125 | A | * | 1/1973 | Dehar | ......................... 285/111 |
| 3,721,460 | A | * | 3/1973 | Holman et al. | ......... 285/148.19 |
| 3,827,731 | A | * | 8/1974 | Floessel et al. | .............. 285/187 |
| 3,892,537 | A | | 7/1975 | Gulati et al. | |
| 4,142,864 | A | | 3/1979 | Rosynsky et al. | |
| 4,295,666 | A | * | 10/1981 | Melanson | ....................... 285/14 |
| 4,344,921 | A | | 8/1982 | Santiago et al. | |
| 4,350,664 | A | | 9/1982 | Gaysert | |
| 4,793,637 | A | * | 12/1988 | Laipply et al. | ................. 285/39 |
| 5,116,085 | A | * | 5/1992 | Carrel | ......................... 285/225 |
| 6,017,498 | A | | 1/2000 | Harding | |
| 6,371,526 | B1 | * | 4/2002 | Ekholm | ................... 285/148.23 |
| 6,422,791 | B1 | * | 7/2002 | Pallini et al. | ............. 405/224.2 |
| 7,445,248 | B2 | | 11/2008 | Thaler et al. | |
| 2003/0132630 | A1 | * | 7/2003 | French | ......................... 285/223 |
| 2010/0133810 | A1 | * | 6/2010 | Krohn | ..................... 285/148.19 |

FOREIGN PATENT DOCUMENTS

WO WO 2011/087819 7/2011

* cited by examiner

*Primary Examiner* — Aaron Dunwoody
(74) *Attorney, Agent, or Firm* — Finnegan, Henderson, Farabow, Garrett & Dunner, LLP

(57) ABSTRACT

A mounting system for connecting an aftertreatment component to an engine is disclosed. The mounting system may include at least one flange. The mounting system may also include a support structure having a first end connected to the at least one flange, and a second end connected to an outer shell circumferentially wrapped around the aftertreatment component. The mounting system may further include at least one seal disposed between the outer shell and an outer surface of the aftertreatment component. The at least one seal may be configured to isolate vibration of the engine from the aftertreatment component.

16 Claims, 5 Drawing Sheets

MOUNTING SYSTEM FOR AFTERTREATMENT COMPONENT

TECHNICAL FIELD

The present disclosure relates generally to a mounting system and more particularly, to a mounting system for an aftertreatment component.

BACKGROUND

Internal combustion engines generate exhaust as a by-product of fuel combustion within the engines. Engine exhaust contains, among other things, unburnt fuel, particulate matter such as soot, and harmful gases such as carbon monoxide or nitrous oxide. To comply with regulatory emissions control requirements, engine exhaust must be cleaned before it is discharged into the atmosphere.

Engines typically include aftertreatment components that remove or reduce harmful gases and particulate matter in the exhaust. The aftertreatment components may be located in an aftertreatment system mounted either on the engine or on a frame of a machine associated with the engine. An on-engine aftertreatment system must meet a large number of criteria designed to ensure longevity and ease of use. For example, an on-engine aftertreatment system should be capable of being assembled in a relatively limited amount of space. Moreover, the components used for mounting the aftertreatment system must be able to carry the weight of the aftertreatment system and withstand loads generated because of sudden changes in velocity or temperature, while maintaining general alignment of an exhaust inlet of the aftertreatment system with an exhaust outlet from the engine.

An exemplary aftertreatment system is disclosed in World Intellectual Property Organization International Publication No. WO 2011/087819 of Kiran et al. that was published on Jul. 21, 2011 ("the '819 publication"). Specifically, the '819 publication discloses a mounting system for an exhaust aftertreatment system that provides some isolation from shock and vibration loads. The disclosed, system includes isolators that attach the exhaust aftertreatment system to a support structure. The '819 publication discloses two different types of isolators, namely stiff isolators and soft isolators. The stiff isolators are used at one end of the mounting system to limit movement of the aftertreatment system at that end. The soft isolators are used in other locations to allow for thermal expansion.

Although the system of the '819 publication may be suitable for some applications, it still may be less than optimal. In particular, the isolators may not sufficiently reduce vibrations of the aftertreatment system during operation of the engine. As a result, components of the aftertreatment system may crack and become damaged, causing reduced performance and failure of the aftertreatment system. Further, the soft isolators may limit an amount of thermal expansion of the aftertreatment system, thereby inducing stress on the aftertreatment components.

The mounting system of the present disclosure solves one or more of the problems set forth above and/or other problems in the art.

SUMMARY

In one aspect, the present disclosure is directed to a mounting system for connecting an aftertreatment component to an engine. The mounting system may include at least one flange. The mounting system may also include a support structure having a first end connected to the at least one flange, and a second end connected to an outer shell circumferentially wrapped around the aftertreatment component. The mounting system may further include at least one seal disposed between the outer shell and an outer surface of the aftertreatment component. The at least one seal may be configured to isolate vibration of the engine from the aftertreatment component.

In another aspect, the present disclosure is directed to a support structure for mounting an aftertreatment component to an engine. The support structure may include a hollow, generally cylindrical body being curved at a first end and substantially straight at a second end. The support structure may also include a flat annular surface located at the first end and configured to connect to at least one flange associated with the engine, and an annular edge located at the second end and configured to connect to an outer shell associated with the aftertreatment component. The support structure may further include a plurality of slits evenly spaced around a perimeter of the body.

In yet another aspect, the present disclosure is directed to an exhaust system. The exhaust system may include an exhaust manifold configured to receive exhaust from an engine. The exhaust manifold may have a first flange. The exhaust, system may also include a pre-turbocharger housing connected to the exhaust manifold at one end and connected to an inlet associated with a turbocharger at another end. The pre-turbocharger housing may have a second flange coupled to the first flange. The exhaust system may further include an aftertreatment component mounted at a location where the exhaust manifold connects to the pre-turbocharger housing, and a mounting system for connecting the aftertreatment component to the exhaust manifold and the pre-turbocharger housing. The mounting system may include a support structure having a first end connected between the first and second flanges, and a second end connected to an outer shell circumferentially wrapped around the aftertreatment component. The mounting system may further include at least one seal disposed between the outer shell and an outer surface of the aftertreatment component. The at least one seal may be configured to isolate vibration of the engine from the aftertreatment component.

DETAILED DESCRIPTION

Figure 1:
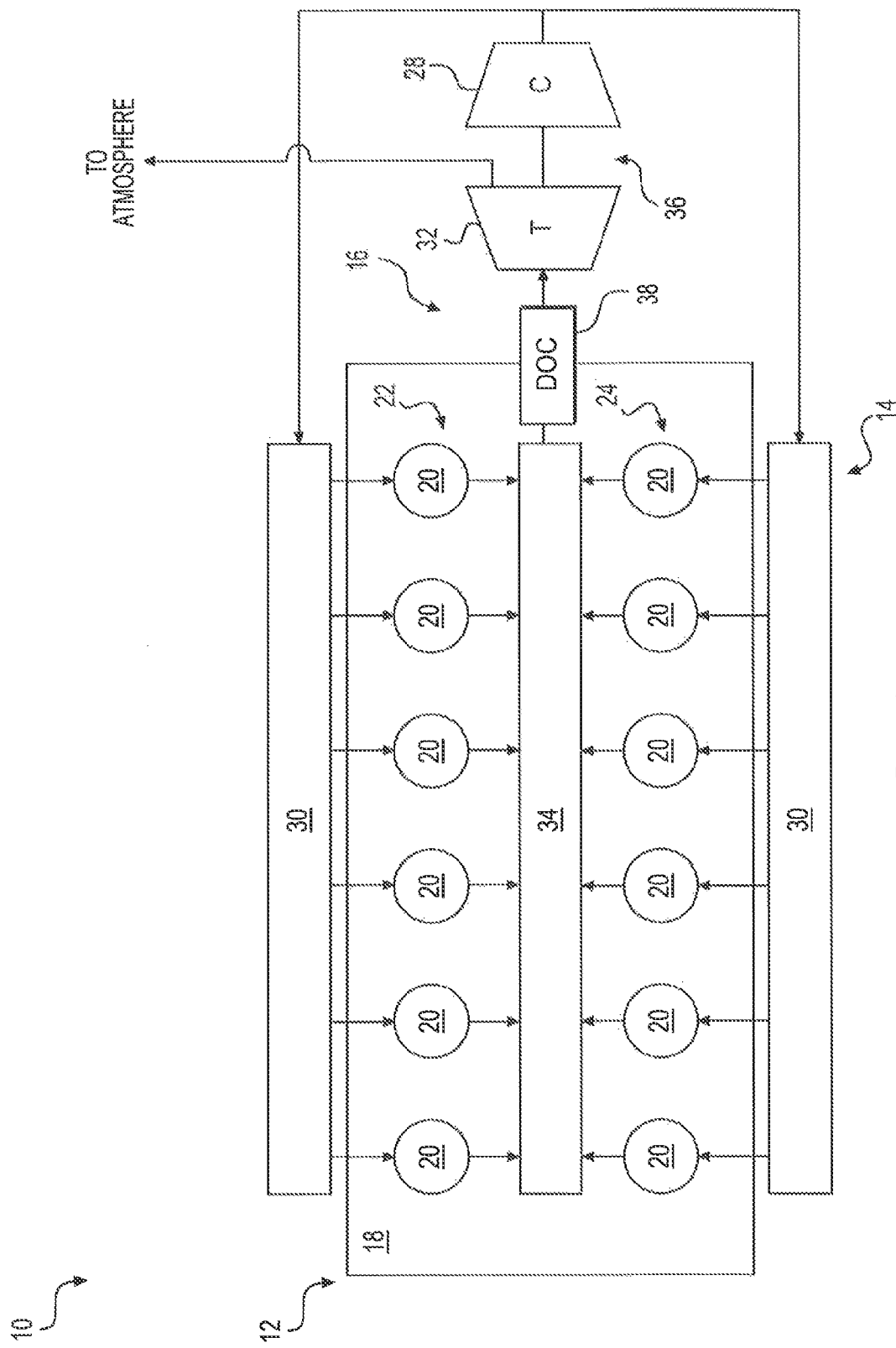
FIG. 1 is a schematic illustration of an exemplary disclosed power system.

FIG. 1 illustrates a power system 10 having an engine 12, an air induction system 14, and an exhaust system 16. For the purposes of this disclosure, engine 12 is depicted and described as a two-stroke diesel engine. One skilled in the art will recognize, however, that engine 12 may be any other type of combustion engine such as, for example, a four-stroke diesel engine, or a two or four-stroke gasoline or gaseous fuel-powered engine. Air induction system 14 may be configured to direct air or a mixture of air and fuel into engine 12 for combustion. Exhaust system 16 may be configured to direct combustion exhaust from engine 12 to the atmosphere.

Engine 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber. In the illustrated embodiment, engine 12 includes twelve cylinders 20 arranged in a V-configuration (i.e., a configuration having first and second banks 22, 24 or rows of cylinders 20). However, it is contemplated that engine 12 may include a greater or lesser number of cylinders 20 and that cylinders 20 may be arranged in an inline configuration, in an opposing-piston configuration, or in another configuration, as desired.

Air induction system 14 may include, among other things, at least one compressor 28 that may embody a fixed geometry compressor, a variable geometry compressor, or any other type of compressor configured to receive air and compress the air to a desired pressure level. Compressor 28 may direct air to one or more intake manifolds 30 associated with engine 12.

Exhaust system 16 may include multiple components that condition and direct exhaust from engine 12 to the atmosphere. For example, exhaust system 16 may include, among other things, an exhaust manifold 34 connected to one or both of banks 22, 24 of cylinders 20, at least one turbine 32 driven by the exhaust from exhaust manifold 34 to rotate compressor 28, and at least one aftertreatment component 38 fluidly connected downstream of exhaust manifold 34 and upstream of turbine 32. Exhaust from engine 12 may be directed to pass through aftertreatment component 38 and be conditioned therein. After exiting aftertreatment component 38, the flow of exhaust may pass through turbine 32 to be discharged to the atmosphere and thereby drive turbine 32 to rotate compressor 28 and compress inlet air. Compressor 28 and turbine 32 may together form a turbocharger 36.

Aftertreatment component 38 may include any one or more of an oxidation catalyst (e.g., a diesel oxidation catalyst—DOC), a particulate filter (e.g., a diesel particulate filter—DPF), a reduction catalyst (e.g., a selective catalytic reduction device—SCR device), a cleanup catalyst (e.g., an ammonia adsorbing catalyst—AMOx catalyst), or another type of component known in the art that is used to convert, reduce, trap, remove, or otherwise condition constituents of the exhaust produced by engine 12. For exemplary purposes only, exhaust system 16 is shown in FIG. 1 as having a single DOC that is configured to catalyze a chemical reaction to alter a composition of exhaust passing through exhaust manifold 34.

Figure 2:
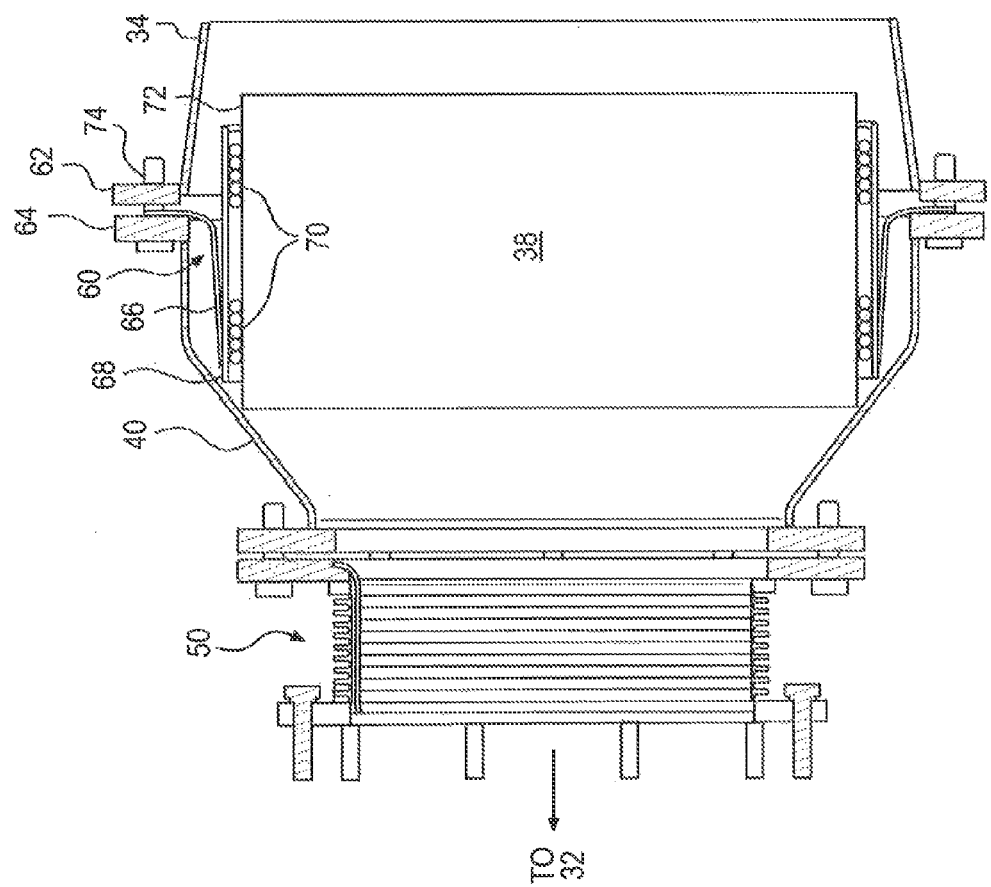
FIG. 2 is a cross-sectional illustration of an exemplary disclosed mounting system that may be used in conjunction with the power system of FIG. 1.

As shown in FIG. 2, aftertreatment component 38 may be at least partially disposed in exhaust manifold 34 and/or a pre-turbocharger housing 40 connected to exhaust manifold 34. For example, aftertreatment component 38 may be mounted at a location where exhaust manifold 34 connects to pre-turbocharger housing 40. With this configuration, exhaust from exhaust manifold 34 may be directed to pass through aftertreatment component 38 and into pre-turbocharger housing 40 prior to entering turbocharger 36. As a result, exhaust may be catalyzed upstream of turbocharger 36 rather than downstream, thereby reducing an amount of space required for power system 10. It is contemplated that, in some embodiments, one or more turbocharger screens (not shown) may be located in pre-turbocharger housing 40 to prevent large particles from being drawn into turbocharger 36. After exiting pre-turbocharger housing 40, the catalyzed exhaust may be directed into a flex coupler 50 that is connected to an inlet (not shown) of turbine 32.

During operation of engine 12, aftertreatment component 38 may experience significant vibration because of its proximity to engine 12. In particular, vibrations from engine 12 may be transferred to aftertreatment component 38 as a result of aftertreatment component 38 being mounted to engine 12. In addition, aftertreatment component 38 may undergo thermal expansion as a temperature of aftertreatment component 38 increases from an ambient temperature to an operating temperature. In particular, dimensions of aftertreatment component 38 may increase laterally in a plane generally orthogonal to a longitudinal axis of aftertreatment component 38. A length of aftertreatment component 38 may also increase along its longitudinal axis because of thermal expansion. In some situations, the vibrations and/or thermal expansion may cause cracking and other damage to aftertreatment component 38, thereby leading to reduced performance and/or failure of aftertreatment component 38.

To control the vibrations and/or thermal expansion, aftertreatment component 38 may be equipped with a mounting system 60. Mounting system 60 may include a first flange 62 associated with exhaust manifold 34, a second flange 64 associated with pre-turbocharger housing 40, a support structure 66 connected to flanges 62, 64, an outer shell 68 connected to support structure 66, and at least one seal 70 disposed between outer shell 68 and an outer surface 72 of aftertreatment component 38. Mounting system 60 may help to isolate vibrations of engine 12 from aftertreatment component 38, and allow thermal expansion of aftertreatment component 38.

Flange 62 may protrude along a perimeter of exhaust manifold 34 at a connection between exhaust manifold 34 and pre-turbocharger housing 40. Likewise, flange 64 may protrude along a perimeter of pre-turbocharger housing 40 at the connection between exhaust manifold 34 and pre-turbocharger housing 40. In the disclosed embodiment, each flange 62, 64 may wrap around the entire perimeter of exhaust manifold 34 and pre-turbocharger housing 40, respectively. However, it is contemplated that, in other embodiments, each flange 62, 64 may instead be divided into multiple segments that are equally spaced around each perimeter (e.g., four flanges equally spaced around each perimeter). A first end of support structure 66 may be connected between flanges 62, 64 via one or more fasteners 74. In one embodiment, fasteners 74 may embody a plurality of bolts, however, any fasteners known in the art may be used, if desired. A second end of support structure 66 opposite the first end may be connected to outer shell 68. In one embodiment, support structure 66 may be welded to outer shell 68. Outer shell 68 may circumferentially wrap around an outer surface of seal 70, which in turn may circumferentially wrap around outer surface 72 of aftertreatment component 38. Outer shell 68 may be slip-fit onto seal 70, or alternatively, it may be a single sheet of material that is wrapped around seal 70 and welded at opposing ends.

Figure 3:
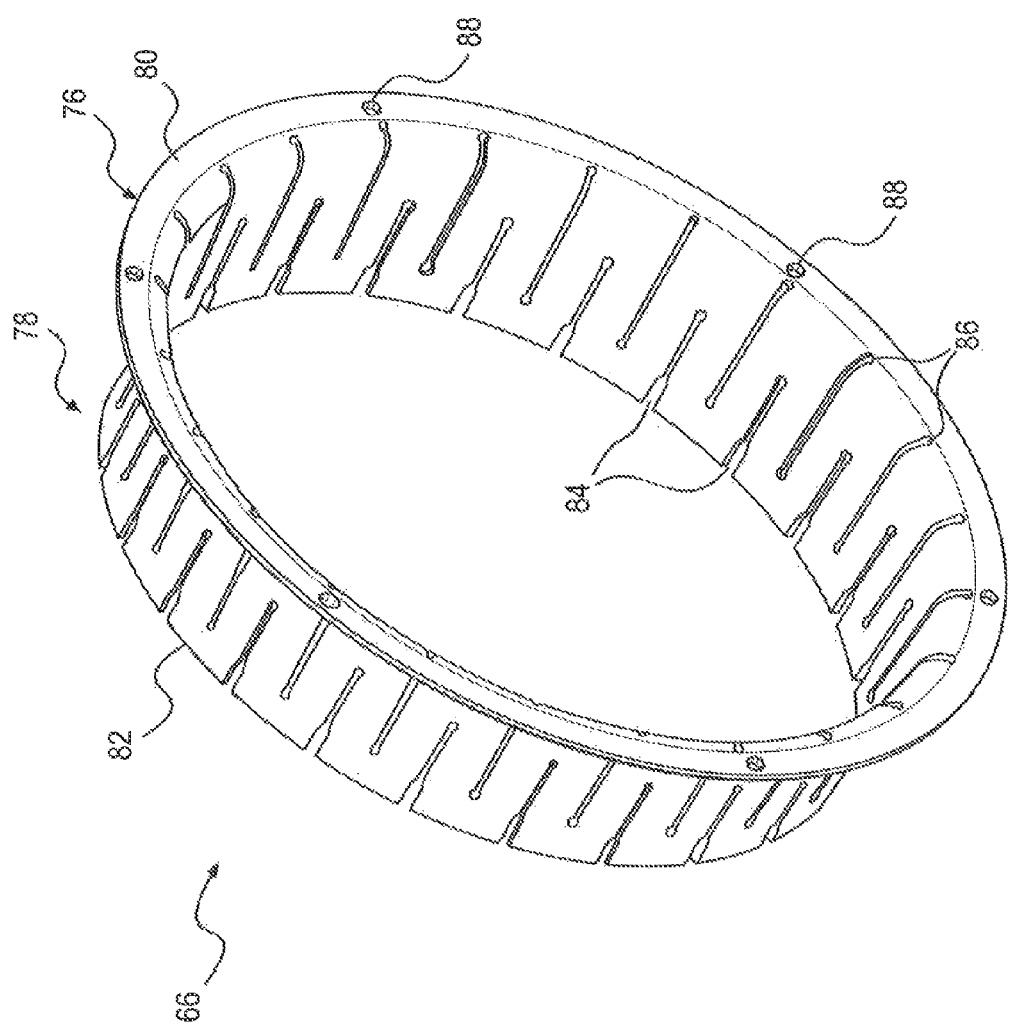
FIG. 3 is a pictorial illustration of an exemplary disclosed support structure that may be used in conjunction with the mounting system of FIG. 2.

FIG. 3 illustrates a pictorial view of an exemplary disclosed support structure 66. Support structure 66 may be configured to allow thermal expansion of aftertreatment component without overstressing itself and/or aftertreatment component 38. As shown in FIG. 3, support structure 66 may be a hollow, generally cylindrical body being curved at a first end 76 and substantially straight at a second end 78. First end 76 of support structure 66 may be connected to flanges 62, 64, while second end 78 of support structure 66 may be connected to outer shell 68. For example, first end 76 may have a flat annular surface 80 configured to mate with surfaces of flanges 62, 64 and provide a tight seal between exhaust manifold 34 and pre-turbocharger housing 40. Specifically, support structure 66 may include a plurality of bolt holes 88 to receive fasteners 74 and connect flanges 62, 64 and support structure 66. Second end 78 may have an annular edge 82 that is secured to (e.g., welded to) outer shell 68.

In the disclosed embodiment, support structure 66 may have one or more slits in its body. For example, a first plurality of slits 84 may be located circumferentially around support structure 66 at second end 78. Slits 84 may be evenly spaced around a perimeter of support structure 66. In one example, each slit 84 may extend from annular edge 82 to a lengthwise center along the longitudinal axis of support structure 66. In addition, a second plurality of slits 86 may be located circumferentially around support structure 66 at first end 76. Slits 86 may be evenly spaced around the perimeter of support structure 66 in between adjacent slits 84. Each slit 86 may extend from annular surface 80 towards annular edge 82.

Slits 84, 86 may allow outer shell 68 to thermally expand during operation of engine 12. Specifically, slits 84, 86 may allow support structure 66 to flex and expand in response to the thermal expansion of outer shell 68. In addition, support structure 66 may be made of a steel alloy having thermal properties that also allow thermal expansion of outer shell 68, without overstressing either outer shell 68 or support structure 66 during thermal expansion.

It is contemplated that, although support structure 66 is shown and described as a one-piece structure, the support structure may instead be divided into multiple segments. For example, in other embodiments, the support structure may embody a plurality of individual strips. Like support structure 66, each strip may have a first end connected between flanges 62, 64, and a second end connected to outer shell 68. In some applications, having a plurality of individual strips may provide more flexibility and allow greater amounts of thermal expansion.

Figure 4:
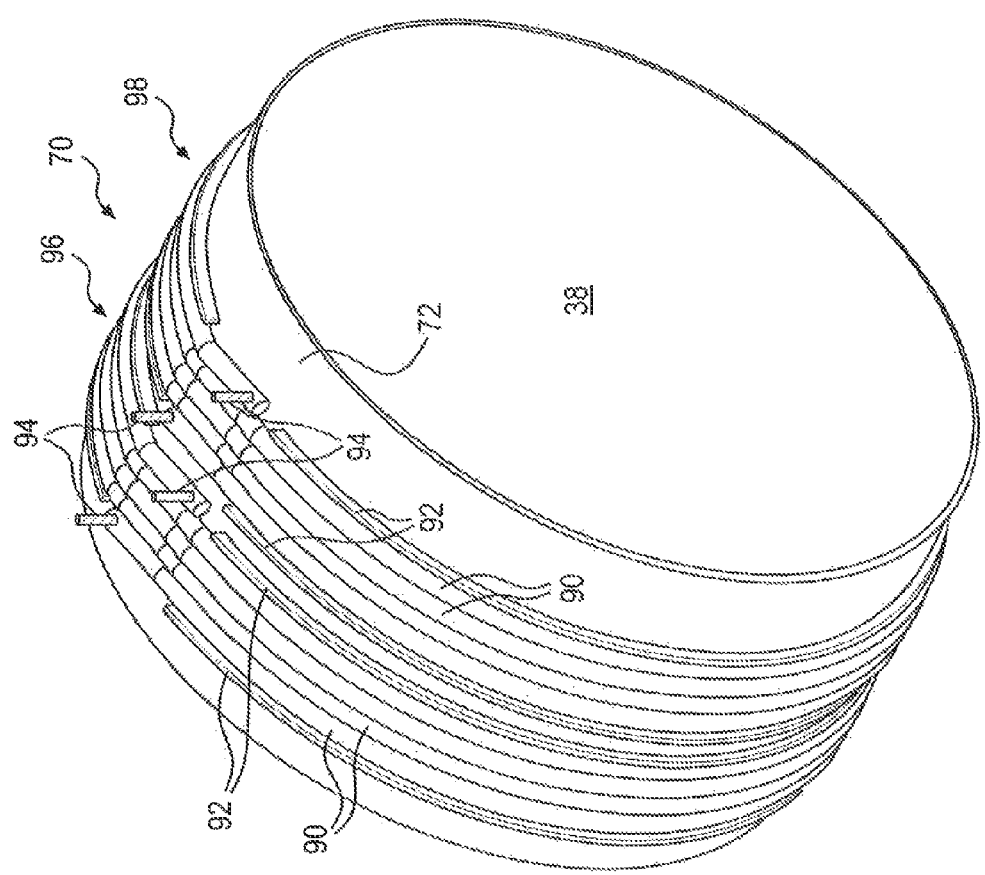
FIG. 4 is a pictorial illustration of an exemplary disclosed aftertreatment component and seal that may be used in conjunction with the mounting system of FIG. 2.

FIG. 4 illustrates a pictorial view of an exemplary disclosed seal 70. In this embodiment, seal 70 may embody one or more rope seals 90. Rope seals 90 may be configured to dampen vibration transferred from engine 12 to aftertreatment component 38. Specifically, rope seal 90 may embody a hollow, fiberglass casing and a stainless steel hollow wire core, which together provide poor transmissibility of vibrational energy. This combination of materials may also provide a flexible structure to ease assembly, while still maintaining desirable strength and mechanical resistance properties (i.e., prevent aftertreatment component 38 from sliding out). Additionally, rope seals 90 may be compressed against aftertreatment component 38 to provide a tight seal to prevent exhaust from flowing around aftertreatment component 38. In addition, because of their relatively high mechanical compliance, rope seals 90 may allow thermal expansion of aftertreatment component 38 without overstressing outer shell 68 or aftertreatment component 38.

As shown in FIG. 4, a plurality of retainers 92 and spikes 94 may be pre-fabricated (e.g., welded) around outer surface 72 of aftertreatment component 38. Rope seals 90 may be circumferentially wrapped around outer surface 72 of aftertreatment component 38 between retainers 92 and secured to spikes 94. For example, a first end of a single rope seal 90 may be secured to a first spike 94, and a second end of the first rope seal 90 may be secured to a second spike 94. In the disclosed embodiment, two groups 96, 98 of rope seals 90, retainers 92, and spike 94 may be used to further increase sealing and vibration isolation. It is contemplated that, in some embodiments, spikes 94 may be trimmed and/or bent prior to installation of outer shell 68 to secure ends of rope seals 90 from loosening.

Figure 5:
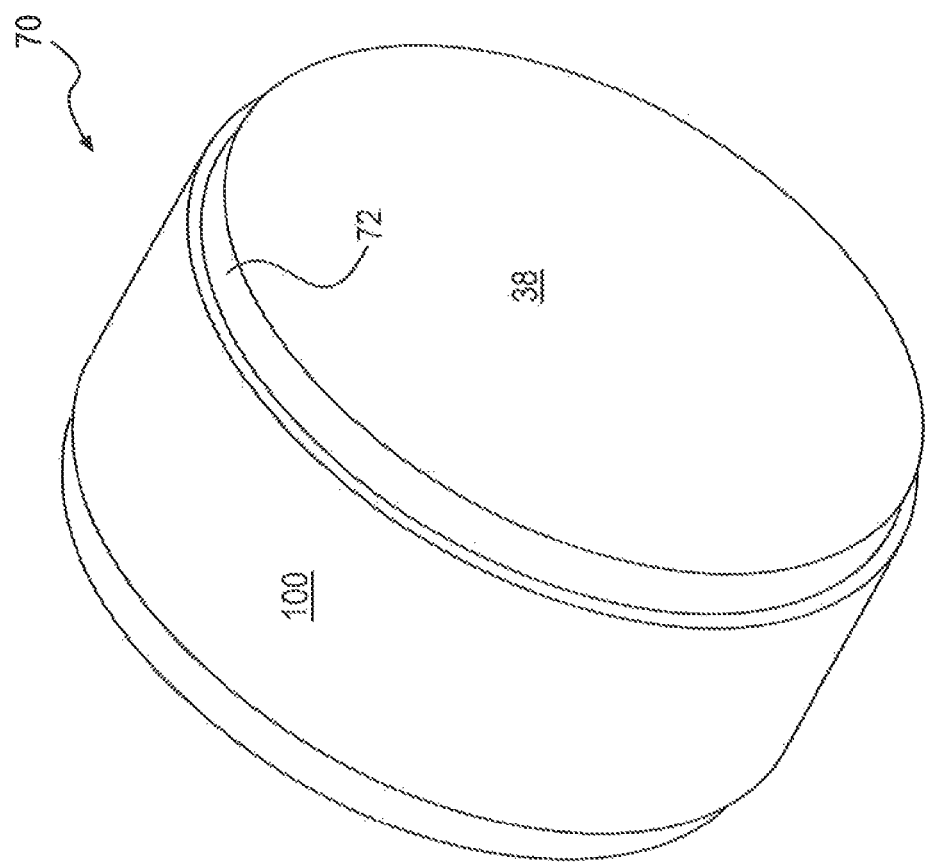
FIG. 5 is a pictorial illustration of the aftertreatment component and another exemplary disclosed seal that may be used in conjunction with the mounting system of FIG. 2.

FIG. 5 illustrates a pictorial view of another exemplary disclosed seal 70. In this embodiment, seal 70 may embody a mat seal 100. Like rope seals 90, mat seal 100 may be configured to dampen vibration transferred from engine 12 to aftertreatment component 38 as well as provide a tight seal to prevent exhaust from flowing around aftertreatment component 38. In one embodiment, mat seal 100 may be a one-piece seal made of a polycrystalline, alumina fiber, which also provides poor transmissibility of vibrational energy. In addition, mat seal 100 may be flexible enough to assist during assembly of mounting system 60, while still having mechanical resistance properties (i.e., prevent aftertreatment component 38 from sliding out) and being capable of sealing exhaust from circumventing aftertreatment component 38. Because of a reduction of parts involved, the use of mat seal 100 may result in easier manufacturing and/or assembly. In addition, because of its relatively high mechanical compliance, mat seal 100 may allow thermal expansion of aftertreatment component 38 without overstressing outer shell 68 or aftertreatment component 38.

INDUSTRIAL APPLICABILITY

The disclosed mounting system may be used in any engine or power system application to secure an aftertreatment component to the engine. In particular, the disclosed mounting system may be used to secure the aftertreatment component when it is subjected to vibration loads caused by operation of the engine. Specifically, rope seals 90 or mat seal 100 may be used to isolate vibrations of the engine from the aftertreatment component.

In addition, the disclosed mounting system may be used to secure an aftertreatment component when the aftertreatment component may be subject to thermal expansion caused by increased operating temperatures. In particular, a support structure 66 may have a plurality of slits 84, 86 that may allow support structure 66 to flex and expand in response to the thermal expansion of outer shell 68. As a result, the disclosed mounting system may hold the aftertreatment component in a desired position while still accommodating dimensional change caused by thermal expansion.

It will be apparent to those skilled in the art that various modifications and variations can be made to the disclosed mounting system. Other embodiments will be apparent to those skilled in the art from consideration of the specification and practice of the disclosed mounting system. It is intended that the specification and examples be considered as exemplary only, with a true scope being indicated by the following claims and their equivalents.

What is claimed:
1. An exhaust system, comprising:
an exhaust manifold configured to receive exhaust from an engine, the exhaust manifold having a first flange;
a pre-turbocharger housing connected to the exhaust manifold at one end and connected to an inlet associ- ated with a turbocharger at another end, the pre-turbocharger housing having a second flange coupled to the first flange;
an aftertreatment component mounted at a location where the exhaust manifold connects to the pre-turbocharger housing; and
a mounting system for connecting the aftertreatment component to the exhaust manifold and the pre-turbocharger housing, the mounting system including:
a support structure having a first end connected between the first and second flanges, and a second end connected to an outer shell circumferentially wrapped around the aftertreatment component; and
at least one seal disposed between the outer shell and an outer surface of the aftertreatment component, the at least one seal configured to isolate vibration of the engine from the aftertreatment component.

2. The exhaust system of claim 1, wherein the at least one seal includes a one-piece mat seal circumferentially wrapped around the aftertreatment component.

3. The exhaust system of claim 1, wherein the at least one seal includes a rope seal circumferentially wrapped around the aftertreatment component.

4. The exhaust system of claim 3, further including a plurality of retainers and a plurality of spikes pre-fabricated around the outer surface of the aftertreatment component, and configured to secure the rope seal to the aftertreatment component.

5. The exhaust system of claim 3, wherein the rope seal is a first rope seal, and the mounting system further includes a second rope seal.

6. The exhaust system of claim 1, wherein the aftertreatment component is at least partially disposed in a housing upstream of a turbocharger associated with the engine.

7. The exhaust system of claim 6, wherein the at least one flange includes a first flange protruding along a perimeter of an exhaust manifold associated with the engine, and a second flange protruding along a perimeter of the housing upstream of the turbocharger.

8. The exhaust system of claim 1, wherein the aftertreatment component is an oxidation catalyst.

9. The exhaust system of claim 1, wherein the first end of the support structure is bolted to the at least one flange, and the second end of the support structure is welded to the outer shell.

10. The exhaust system of claim 1, wherein the support structure for mounting an aftertreatment component to an engine, comprising:
a hollow, generally cylindrical body being curved at a first end and substantially straight at a second end;
a flat annular surface located at the first end and configured to connect to at least one flange associated with the engine;
an annular edge located at the second end and configured to connect to an outer shell associated with the aftertreatment component; and
a plurality of slits evenly spaced around a perimeter of the body.

11. The exhaust system of claim 10, wherein the plurality of slits includes:
a first plurality of slits extending from the annular edge to a lengthwise center along a longitudinal axis of the support structure; and
a second plurality of slits extending from the annular surface towards the annular edge, the second plurality of slits being disposed in between adjacent slits of the first plurality of slits.

12. The exhaust system of claim 10, further including a plurality of bolt holes configured to receive bolts to connect the support structure to the at least one flange.

13. The exhaust system of claim 10, wherein the annular edge is welded to the outer shell.

14. The exhaust system of claim 1, wherein the support structure is a hollow, generally cylindrical body being curved at the first end and substantially straight at the second end.

15. The exhaust system of claim 14, wherein the support structure has a plurality of slits located circumferentially around at least one of the first end and the second end.

16. The exhaust system of claim 15, wherein the plurality of slits includes:
a first plurality of slits evenly spaced around a perimeter of the support structure at the first end; and
a second plurality of slits evenly spaced around the perimeter of the support structure at the second end and in between adjacent slits of the first plurality of slits.

* * * * *